United States Patent
Sun et al.

(10) Patent No.: US 11,079,244 B2
(45) Date of Patent: *Aug. 3, 2021

(54) METHODS AND SYSTEMS FOR ESTIMATING TIME OF ARRIVAL

(71) Applicant: BEIJING DIDI INFINITY TECHNOLOGY AND DEVELOPMENT CO., LTD., Beijing (CN)

(72) Inventors: Shujuan Sun, Beijing (CN); Xinqi Bao, Beijing (CN); Zheng Wang, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/713,049

(22) Filed: Dec. 13, 2019

(65) Prior Publication Data

US 2020/0116504 A1  Apr. 16, 2020

Related U.S. Application Data

(63) Continuation of application No. PCT/CN2017/089518, filed on Jun. 22, 2017.

(51) Int. Cl.
*G01C 21/34* (2006.01)
*G01C 21/36* (2006.01)
(Continued)

(52) U.S. Cl.
CPC ....... *G01C 21/343* (2013.01); *G01C 21/3484* (2013.01); *G01C 21/3492* (2013.01);
(Continued)

(58) Field of Classification Search
CPC .............. G01C 21/343; G01C 21/3407; G01C 21/3484; G01C 21/3492; G01C 21/3691;
(Continued)

(56) References Cited

U.S. PATENT DOCUMENTS 9,207,098 B2  12/2015  Rings
9,261,366 B2   2/2016  Coleman et al.
(Continued)

FOREIGN PATENT DOCUMENTS

CN  101706888 A   5/2010
CN  102708879 A  10/2012
(Continued)

OTHER PUBLICATIONS

Gurmu ZK., Artificial Neural Network Travel Time Prediction Model for Buses Using Only GPS Data (J Pub Trans) (Year: 2014).*
(Continued)

*Primary Examiner* — Charles J Han
(74) *Attorney, Agent, or Firm* — Metis IP LLC

(57) ABSTRACT

A method for determining an ETA relating to a target route is provided. The method includes obtaining, a target route associated with a user; determining characteristic data relating to the target route, the characteristic data including first feature data corresponding to at least a portion of the target route; obtaining an estimation model, the estimation model including a first sub-model and a second sub-model; determining first cell state data and first hidden state data based on the first feature data and the first sub-model; determining a first vector based on the first cell state data and the first hidden state data; determining second cell state data and second hidden state data based on the first vector and the second sub-model; and determining an ETA relating to the target route based on the second cell state data and the second hidden state data.

18 Claims, 11 Drawing Sheets

(51) Int. Cl.
    *G06N 3/04*     (2006.01)
    *G06N 3/08*     (2006.01)
    *G06Q 10/04*     (2012.01)

(52) U.S. Cl.
    CPC ....... *G01C 21/3691* (2013.01); *G06N 3/0454* (2013.01); *G06N 3/08* (2013.01); *G06Q 10/047* (2013.01)

(58) Field of Classification Search
    CPC ...... G06N 3/0454; G06N 3/08; G06Q 10/047; G08G 1/0112; G08G 1/0129; G08G 1/0133; G08G 1/0141; G08G 1/096827; G08G 1/09685; G08G 1/127
    See application file for complete search history.

(56) References Cited

U.S. PATENT DOCUMENTS

| | | | |
|---|---|---|---|
| 9,459,112 | B2 | 10/2016 | Nye et al. |
| 2011/0302116 | A1 | 12/2011 | Ide et al. |
| 2014/0278028 | A1 | 9/2014 | Nye et al. |
| 2015/0241242 | A1 | 8/2015 | Rings |
| 2017/0138751 | A1* | 5/2017 | Martyniv ............... G06Q 10/02 |

FOREIGN PATENT DOCUMENTS

| | | |
|---|---|---|
| CN | 104346926 A | 2/2015 |
| CN | 105098643 A | 11/2015 |
| CN | 105740226 A | 7/2016 |
| CN | 106022541 A | 10/2016 |
| CN | 106096767 A | 11/2016 |
| CN | 106251642 A | 12/2016 |
| CN | 106652534 A | 5/2017 |
| CN | 106875670 A | 6/2017 |

OTHER PUBLICATIONS

Duan Y, et al., Travel Time Prediction with LSTM Neural Network (IEEE) (Year: 2016).*
International Search Report in PCT/CN2017/089518 dated Feb. 24, 2018, 4 pages.
Written Opinion in PCT/CN2017/089516 dated Feb. 24, 2018, 4 pages.
Nal Kalchbrenner et al., Grid Long Short-Term Memory, Under review as a conference paper at ICLR, 2016, 15 pages.
First Office Action in Chinese Application No. 201780017206.7 dated Feb. 18, 2021, 19 pages.

* cited by examiner

500

- 510 Obtaining a target route associated with a user
- 520 Determining characteristic data relating to the target route including first feature data
- 530 Obtaining an estimation model including a first sub-model and a second sub-model
- 540 Determining first cell state data and first hidden state data based on the first sub-model and the first feature data
- 550 Determining a first vector based on the first cell state data and the first hidden state data
- 560 Determining second cell state data and second hidden state data based on the first vector and the second sub-model
- 570 Determining an ETA relating to the target route based on the second cell state data and the second hidden state data

FIG. 5A

METHODS AND SYSTEMS FOR ESTIMATING TIME OF ARRIVAL

CROSS REFERENCE TO RELATED APPLICATION

This present application is a continuation of International Application No. PCT/CN2017/089518 filed on Jun. 22, 2017, the entire contents of which are incorporated herein by reference.

TECHNICAL FIELD

This application generally relates to machine learning, and in particular, to methods and systems for estimating time of arrival using machine learning techniques.

BACKGROUND

Many location-based services and/or applications, such as web mapping services, navigation services, and online on-demand transportation services, may need accurate estimated time of arrival (ETA) to provide services. For example, a mapping service may need to automatically update the ETA for a vehicle in real time to provide driving directions, navigation suggestions, positioning information, and other information to users of the mapping service.

SUMMARY

In one aspect of the present disclosure, a system is provided. The system may include at least one computer-readable storage medium including a set of instructions for estimating time of arrival; at least one processor in communication with the at least one computer-readable storage medium, wherein when executing the set of instructions, the at least one processor is directed to: obtain a target route associated with a user; determine characteristic data relating to the target route, wherein the characteristic data may include first feature data corresponding to at least a portion of the target route; obtain an estimation model for estimating time of arrival, wherein the estimation model may include a first sub-model and a second sub-model; determine first cell state data and first hidden state data based on the first feature data and the first sub-model; determine a first vector based on the first cell state data and the first hidden state data; determine second cell state data and second hidden state data based on the first vector and the second sub-model; and determine an estimated time of arrival (ETA) relating to the target route based on the second cell state data and the second hidden state data.

In another aspect of the present disclosure, a method is provided. The method may include obtaining, by a processor, a target route associated with a user; determining, by the processor, characteristic data relating to the target route, wherein the characteristic data may include first feature data corresponding to at least a portion of the target route; obtaining, by the processor, an estimation model for estimating time of arrival, wherein the estimation model may include a first sub-model and a second sub-model; determining, by the processor, first cell state data and first hidden state data based on the first feature data and the first sub-model; determining, by the processor, a first vector based on the first cell state data and the first hidden state data; determining, by the processor, second cell state data and second hidden state data based on the first vector and the second sub-model; and determining, by the processor, an estimated time of arrival (ETA) relating to the target route based on the second cell state data and the second hidden state data.

In another aspect of the present disclosure, a system is provided. The system may include a route obtaining module configured to obtain a target route associated with a user; a feature extraction module configured to extract characteristic data relating to the target route, wherein the characteristic data may include first feature data corresponding to at least a portion of the target route; a time estimation module configured to: obtain an estimation model for estimating time of arrival, wherein the estimation model may include a first sub-model and a second sub-model; determine first cell state data and first hidden state data based on the first feature data and the first sub-model; determine a first vector based on the first cell state data and the first hidden state data; determine second cell state data and second hidden state data based on the first vector and the second sub-model; and determine an estimated time of arrival (ETA) relating to the target route based on the second cell state data and the second hidden state data.

In some embodiments, the system may further include a model determination module configured to generate the estimation model.

In another aspect of the present disclosure, a non-transitory computer readable medium is provided. The non-transitory computer readable medium may include at least one set of instructions for initiating a connection between a terminal and an on-demand transportation platform, wherein when executed by at least one processor of an electronic terminal, the at least one set of instructions directs the at least one processor to perform acts of: obtaining, a target route associated with a user; determining characteristic data relating to the target route, wherein the characteristic data may include first feature data corresponding to at least a portion of the target route; obtaining an estimation model for estimating time of arrival, wherein the estimation model may include a first sub-model and a second sub-model; determining first cell state data and first hidden state data based on the first feature data and the first sub-model; determining a first vector based on the first cell state data and the first hidden state data; determining second cell state data and second hidden state data based on the first vector and the second sub-model; and determining an estimated time of arrival (ETA) relating to the target route based on the second cell state data and the second hidden state data.

In some embodiments, the first sub-model may include a long short term memory (LSTM) neural network model.

In some embodiments, the second sub-model may include a long short term memory (LSTM) neural network model.

In some embodiments, the characteristic data may further include second feature data corresponding to the target route, and the method may further include determining the first vector based on the first cell state data, the first hidden state data, and the second feature data.

In some embodiments, the estimation model may further include a third sub-model, and the determining of the ETA relating to the target route may further include determining a second vector based on the second cell state data and the second hidden state data; and determining the ETA relating to the target route based on the second vector and the third sub-model.

In some embodiments, the third sub-model may include a multi-layer perceptron (MLP) neural network model.

In some embodiments, the first feature data relating to at least a portion of the target route may include at least one of speed data relating to the at least a portion of the target route;

a start point of the at least a portion of the target route; an end point of the at least a portion of the target route; a distance of the at least a portion of the target route; traffic data relating to the at least a portion of the target route; timing data relating to the at least a portion of the target route; or travel mode relating to the at least a portion of the target route.

In some embodiments, the second feature data relating a target route may include at least one of speed data relating to the target route; a starting location of the target route; a destination of the target route; a distance of the target route; traffic data relating to the target route; timing data relating to the target route; or travel mode relating to the target route.

In some embodiments, the method may further include obtaining a plurality of historical routes and historical time of arrival data relating to the plurality of historical routes; determining historical characteristic data for the each of the plurality of historical routes, wherein the historical characteristic data may include first training feature data corresponding to at least a portion of each of the plurality of historical; and generating the estimation model based on the first training feature data and the historical time of arrival data relating to the plurality of historical routes.

In some embodiments, the historical characteristic data may further include second training feature data corresponding to each of the plurality of historical routes, and the method may further include generating the estimation model based, at least in part, on the second training feature data.

In some embodiments, the method may further include obtaining ending times of the plurality of historical routes; sorting the plurality of historical routes according to a chronological order of the ending times of the plurality of historical routes; and generating the estimation model based on the sorted plurality of historical routes.

In some embodiments, to generate the estimation model, the method may further include identifying, from the plurality of historical routes, one or more first training routes and one or more second training routes; extracting first historical characteristic data and first historical time of arrival data relating to the one or more first training routes; determining a first ETA determination model based on the first historical characteristic data and the first historical time of arrival; extracting second historical characteristic data and second historical time of arrival data relating to the one or more second training routes; and modifying the first ETA determination model based on the second historical characteristic data and the second historical time of arrival data to determine a second ETA determination model; determining whether a matching condition is satisfied based on at least one of the first ETA determination model or the second ETA determination model; and determining the second ETA determination model as the estimation model, in response to determining that the matching condition is satisfied. In some embodiments, the method may further include determining a loss function based on at least one of the first ETA determination model or the second ETA determination model; and determining whether the loss function converges to a first value.

In some embodiments, the method may further include selecting, from the plurality of historical routes, one or more third historical routes; extracting third historical characteristic data and third historical time of arrival data relating to the one or more third historical routes; determining historical estimated time of arrival data relating to the one or more third historical routes; determining an error based on the historical estimated time of arrival and historical time of arrival data relating to the one or more third historical routes; determining whether the error is less than a second value.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

Figures herein are provided for further understanding of the present disclosure, and constitute a part of this present disclosure. The exemplary embodiments of the present disclosure and the description are used to explain the present disclosure, and not intended to be limiting. In the drawing, the like reference numerals denote the same parts.

FIG. 5A is a flowchart of another exemplary process for determining an estimated time of arrival relating to a target route according to some embodiments of the present disclosure;

DETAIL DESCRIPTION

Figure 1:
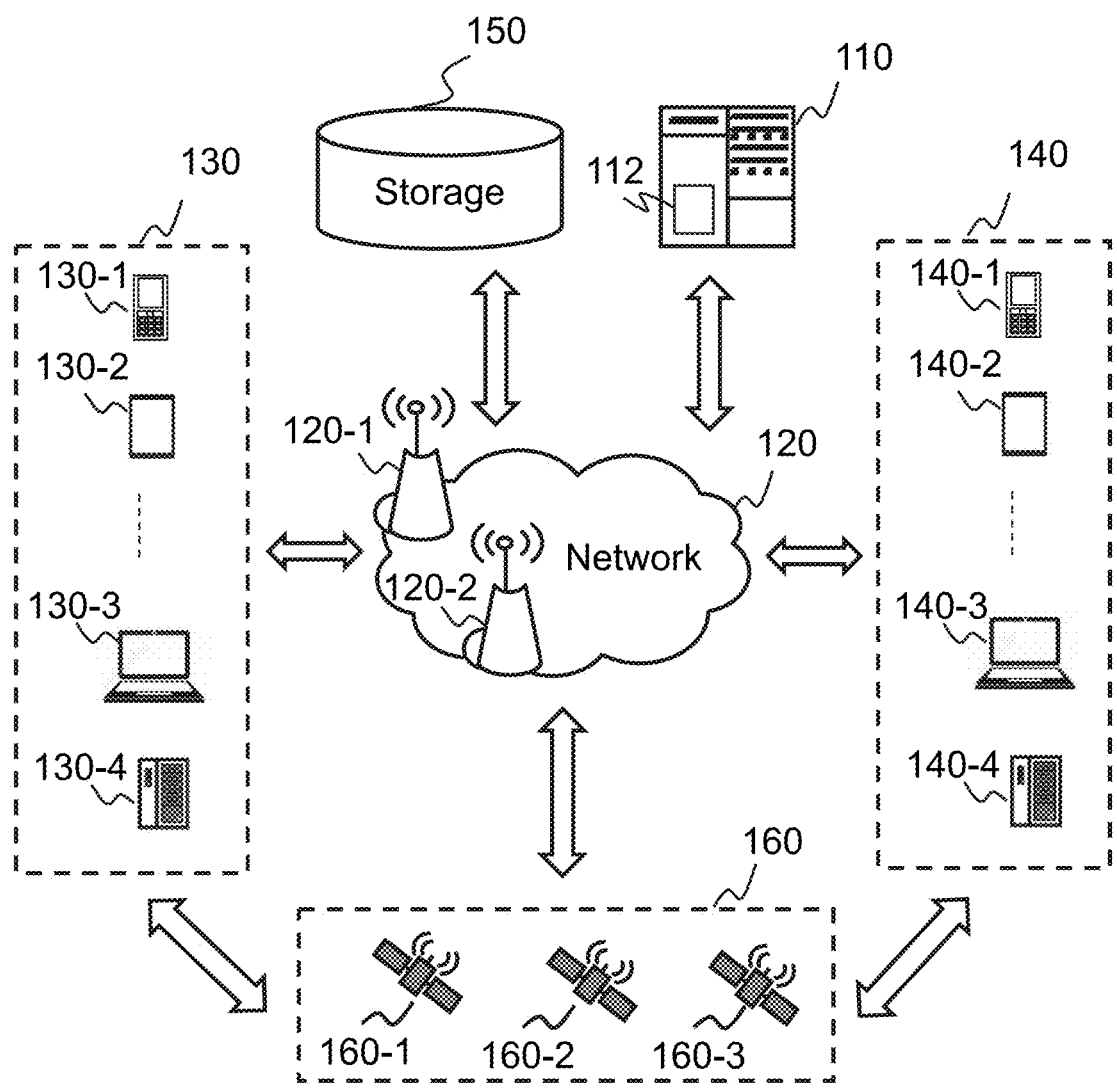
FIG. 1 is a block diagram of an exemplary system for on-demand transportation service according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure, and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order or simultaneously. Moreover, one or more other operations may be added to the flowcharts. One or more operations may be removed from the flowcharts.

Moreover, while the systems and methods disclosed in the present disclosure are described primarily regarding allocating a set of shareable orders, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a web page, a plug-in of a browser, a client terminal, a custom system, an internal analysis system, an artificial intelligence robot, or the like, or any combination thereof.

The terms "passenger," "requester," "requestor," "service requester," "service requestor" and "customer" in the present disclosure are used interchangeably to refer to an individual, an entity, or a tool that may request or order a service. Also, the terms "driver," "provider," "service provider," and "supplier" in the present disclosure are used interchangeably to refer to an individual, an entity, or a tool that may provide a service or facilitate the providing of the service. The term "user" in the present disclosure may refer to an individual, an entity, or a tool that may request a service, order a service, provide a service, or facilitate the providing of the service. For example, the user may be a passenger, a driver, an operator, or the like, or any combination thereof. In the present disclosure, terms "passenger" and "passenger terminal" may be used interchangeably, and terms "driver" and "driver terminal" may be used interchangeably.

The terms "service," "request," and "service request" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to online systems and methods for determining an estimated time of arrival (ETA) relating to a route. To this end, the system may first obtain the route associated with a service requester; and then extract characteristic data relating to the route; and then obtain an estimation model for determining estimated time of arrival; and then determine the estimated time of arrival relating to the route based on the estimation model and the characteristic data. Since the characteristic data includes feature data corresponding to the links of the route, it may improve the accuracy of estimating time of arrival relating to the route.

It should be noted that online on-demand transportation service, such as online taxi-hailing including taxi hailing combination services, is a new form of service rooted only in post-Internet era. It provides technical solutions to users and service providers that could raise only in post-Internet era. In pre-Internet era, when a user hails a taxi on street, the taxi request and acceptance occur only between the passenger and one taxi driver that sees the passenger. If the passenger hails a taxi through telephone call, the service request and acceptance may occur only between the passenger and one service provider (e.g., one taxi company or agent). Online taxi, however, allows a user of the service to real-time and automatic distribute a service request to a vast number of individual service providers (e.g., taxi) distance away from the user. It also allows a plurality of service providers to respond to the service request simultaneously and in real-time. Therefore, through the Internet, the online on-demand transportation systems may provide a much more efficient transaction platform for the users and the service providers that may never meet in a traditional pre-Internet transportation service system. When the system receives an order from passenger, the system may determine an estimated time of arrival relating to the order. Based on the estimated time of arrival, the passenger may schedule his/her time. Based on the estimated time of arrival, the system may combine the order with other orders together and send the combination result to a driver to make the allocation of orders more reasonable.

FIG. 1 is a block diagram of an exemplary on-demand service system 100 according to some embodiments of the present disclosure. For example, the on-demand service system 100 may be an online transportation service platform for transportation services such as taxi hailing service, chauffeur service, express car service, carpool service, bus service, driver hire, and shuttle service. The on-demand service system 100 may be an online platform including a server 110, a network 120, a requester terminal 130, a provider terminal 140, a storage 150 and a positioning system 160. The server 110 may include a processing engine 112.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the requester terminal 130, the provider terminal 140, and/or the storage 150 via the network 120. As another example, the server 110 may connect to the requester terminal 130, the provider terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions of the server 110 described in the present disclosure. For example, the processing engine 112 may be configured to obtain a plurality of historical on-demand services and determine an ETA to a specified location. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the on-demand service system 100 (e.g., the server 110, the requester terminal 130, the provider terminal 140, the storage 150, and the positioning system 160) may transmit information and/or data to other component(s) in the on-demand service system 100 via the network 120. For example, the server 110 may receive a service request from the requester terminal 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information between them.

In some embodiments, a requester may be a user of the requester terminal 130. In some embodiments, the user of the requester terminal 130 may be someone other than the requester. For example, a user A of the requester terminal 130 may use the requester terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requester" and "requester terminal" may be used interchangeably, and "provider" and "provider terminal" may be used interchangeably.

In some embodiments, the requester terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the requester terminal 130 may be a device with positioning technology for locating the position of the requester and/or the requester terminal 130.

In some embodiments, the provider terminal 140 may be similar to, or the same device as the requester terminal 130. In some embodiments, the provider terminal 140 may be a device with positioning technology for locating the position of the provider and/or the provider terminal 140. In some embodiments, the requester terminal 130 and/or the provider terminal 140 may communicate with another positioning device to determine the position of the requester, the requester terminal 130, the provider, and/or the provider terminal 140. In some embodiments, the requester terminal 130 and/or the provider terminal 140 may send positioning information to the server 110.

The storage 150 may store data and/or instructions. In some embodiments, the storage 150 may store data obtained from the requester terminal 130 and/or the provider terminal 140. In some embodiments, the storage 150 may store data and/or instructions that the server 110 may execute or use to perform exemplary methods described in the present disclosure. For example, the storage 150 may store a plurality of historical routes and map data associated with a certain district. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components of the on-demand service system 100 (e.g., the server 110, the requester terminal 130, the provider terminal 140). One or more components of the on-demand service system 100 may access the data or instructions stored in the storage 150 via the network 120. In some embodiments, the storage 150 may be directly connected to or communicate with one or more components of the on-demand service system 100 (e.g., the server 110, the requester terminal 130, the provider terminal 140). In some embodiments, the storage 150 may be part of the server 110.

The positioning system 160 may determine information associated with an object, for example, one or more of the requester terminal 130, the provider terminal 140, etc. The information may include a location, an elevation, a velocity, or an acceleration of the object, or a current time. For example, the positioning system 160 may determine a current location of the requester terminal 130. In some embodiments, the positioning system 160 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The location may be in the form of coordinates, such as latitude coordinate and longitude coordinate, etc. The positioning system 160 may include one or more satellites, for example, a satellite 160-1, a satellite 160-2, and a satellite 160-3. The satellites 160-1 through 160-3 may determine the information mentioned above independently or jointly. The satellite positioning system 160 may send the above-mentioned information to the network 120, the requester terminal 130, or the provider terminal 140 via wireless connections.

In some embodiments, one or more components of the on-demand service system 100 (e.g., the server 110, the requester terminal 130, the provider terminal 140) may access the storage 150. In some embodiments, one or more components of the on-demand service system 100 may read and/or modify information relating to the requester, provider, and/or the public when one or more conditions are met. For example, the server 110 may read and/or modify one or more users' information after a service. As another example, the provider terminal 140 may access information relating to the requester when receiving a service request from the requester terminal 130, but the provider terminal 140 may not modify the relevant information of the requester.

In some embodiments, information exchanging of one or more components of the on-demand service system 100 may be achieved by way of requesting a service. The object of the service request may be any product. In some embodiments, the product may be a tangible product or immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof.

One of ordinary skill in the art would understand that when an element of the on-demand service system 100 performs, the element may perform through electrical signals and/or electromagnetic signals. For example, when a service requester terminal 130 processes a task, such as making a determination, identifying or selecting an object, the requester terminal 130 may operate logic circuits in its processor to perform such task. When the service requester terminal 130 sends out a service request to the server 110, a processor of the service requester terminal 130 may generate electrical signals encoding the request. The processor of the service requester terminal 130 may then send the electrical signals to an output port. If the service requester terminal 130 communicates with the server 110 via a wired network, the output port may be physically connected to a cable, which further transmit the electrical signal to an input port of the server 110. If the service requester terminal 130 communicates with the server 110 via a wireless network, the output port of the service requester terminal 130 may be one or more antennas, which convert the electrical signal to electromagnetic signal. Similarly, a service provider terminal 140 may process a task through operation of logic circuits in its processor, and receive an instruction and/or service request from the server 110 via electrical signal or electromagnet signals. Within an electronic device, such as the service requester terminal 130, the service provider terminal 140, and/or the server 110, when a processor thereof processes an instruction, sends out an instruction, and/or performs an action, the instruction and/or action is conducted via electrical signals. For example, when the processor retrieves or saves data from a storage medium, it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
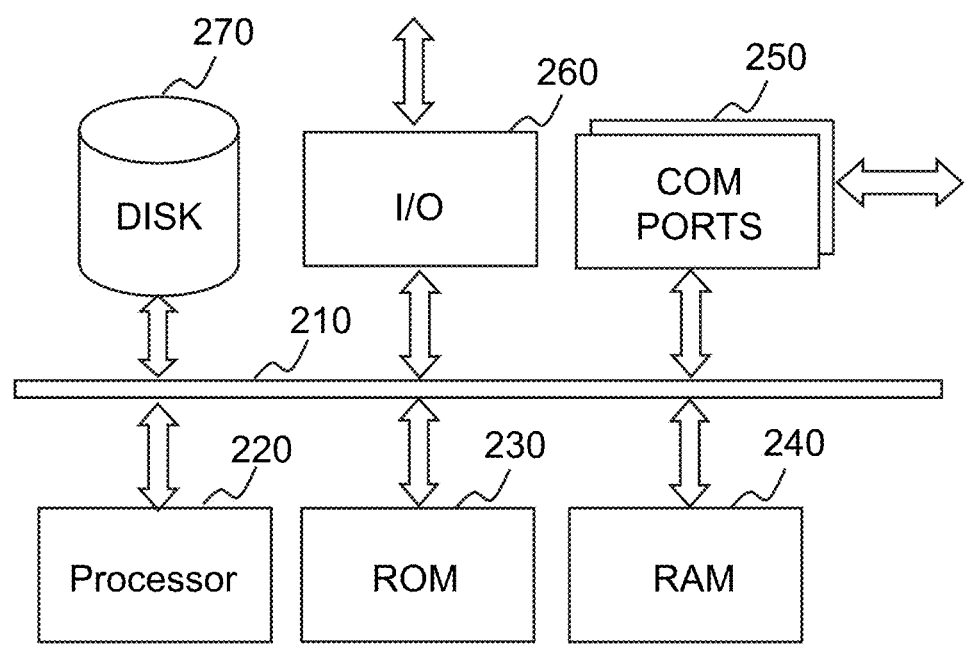
FIG. 2 is a block diagram of an exemplary computing device according to some embodiments of the present disclosure.

FIG. 2 is a schematic diagram illustrating exemplary hardware and software components of a computing device 200 on which the server 110, the requester terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general-purpose computer or a special-purpose computer; both may be used to implement an on-demand system for the present disclosure. The computing device 200 may be used to implement any component of the on-demand service as described herein. For example, the processing engine 112 may be implemented on the computing device 200, via its hardware, software program, firmware, or any combination thereof.

The computing device 200, for example, may include COM ports 250 connected to and from a network connected thereto to facilitate data communications. The computing device 200 may also include a processor 220 for executing program instructions. The exemplary computing device may include an internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components therein. The computing device 200 may also receive programming and data via network communications.

Merely for illustration, only one processor is described in FIG. 2. Multiple processors are also contemplated; thus operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B or the first and second processors jointly execute steps A and B).

Figure 3A:
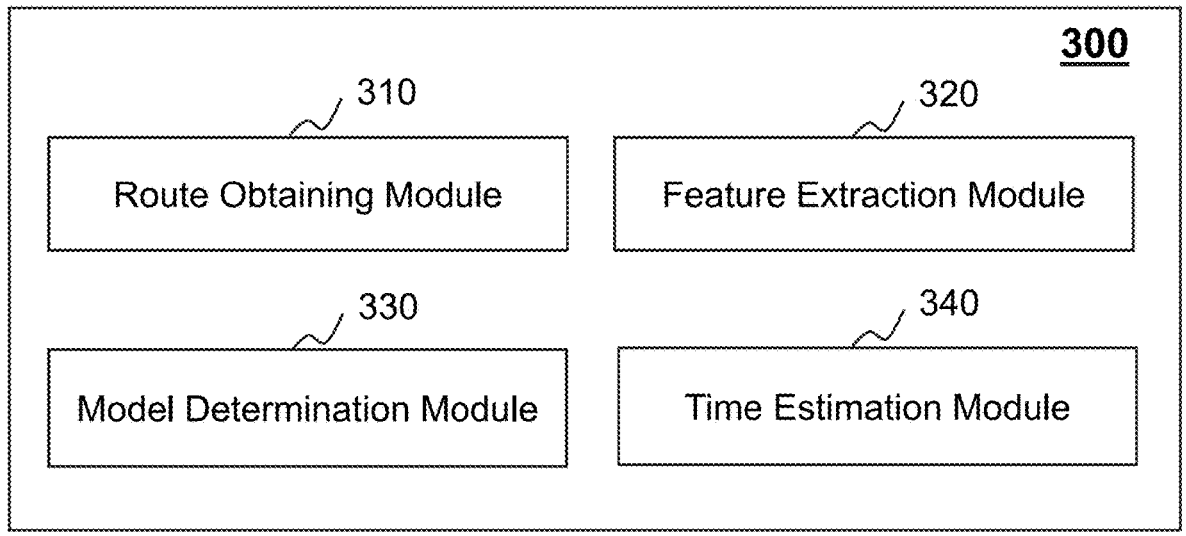
FIG. 3A is a block diagram of an exemplary processor for estimating time of arrival according to some embodiments of the present disclosure.

FIG. 3A is a block diagram of an exemplary processor 300 for estimating time of arrival according to some embodiments of the present disclosure. The processor 300 may be in communication with a computer-readable storage (e.g., a storage 150, a requester terminal 130, or a provider terminal 140), and may execute instructions stored in the computer-readable storage medium. In some embodiments, the processor 300 may include a route obtaining module 310, a feature extraction module 320, a model determination module 330, and a time estimation module 340.

The route obtaining module 310 may obtain a target route associated with a user and/or a plurality of historical routes. In some embodiments, the target route may be associated with an order initiated by the user (e.g., a passenger) via the requester terminal 130. In some embodiments, the target route may include a route from one location to one or more other locations. In some embodiments, the historical routes may be the orders having been completed. The plurality of historical routes relating to a plurality of drivers. In some embodiments, the historical routes may include routes between each any two locations. The route obtaining module 310 may obtain the target route or the plurality of historical routes through the requester terminal 130 or the provider terminal 140. The route obtaining module 310 may obtain the historical routes from the storage 150.

The feature extraction module 320 may extract feature data relating to a route (e.g., the target route or the plurality of historical routes). The feature data relating to a route may include feature data relating to one or more links of the route. In some embodiments, the feature data may also include feature data relating to the whole route.

The model determination module 330 may train the estimation model for estimating time of arrival. For example, the model determination module 330 may train the estimation model for estimating time of arrival based on the plurality of historical routes.

The time estimation module 340 may determine an estimated time of arrival (ETA). For example, the time estimation module 340 may determine the ETA relating to the target route based on the estimation model.

Figure 3B:
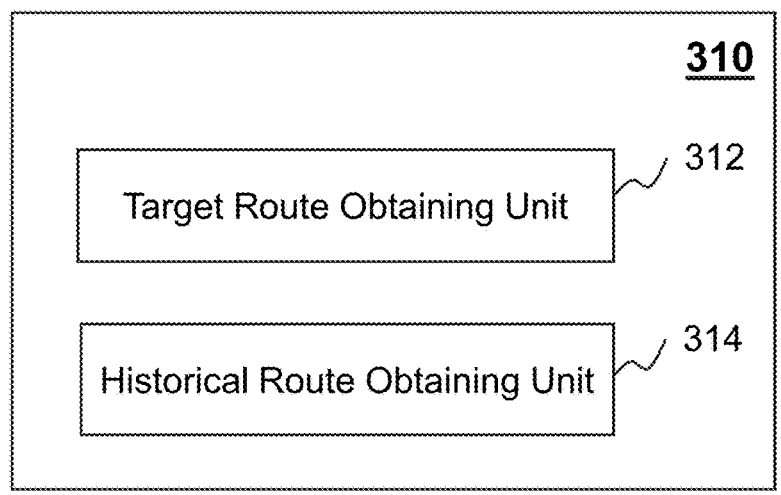
FIG. 3B is a block diagram of an exemplary route obtaining module according to some embodiments of the present disclosure.

FIG. 3B is a block diagram of an exemplary route obtaining module 310 according to some embodiments of the present disclosure. The route obtaining module 310 may include a target route obtaining unit 312 and a historical route obtaining unit 314.

The target route obtaining unit 312 may obtain a target route associated with a user. The target route may include a route from one location to one or more other locations. The target route obtaining unit 312 may obtain the target route through the requester terminal 130 or the provider terminal 140.

The historical route obtaining unit 314 may obtain a plurality of historical routes. The plurality of historical routes may include routes between each any two locations. The historical route obtaining unit 314 may obtain the plurality of historical routes from the storage 150. In some embodiments, the historical route obtaining unit 314 may obtain one or more first training routes or one or more second training routes from the plurality of historical routes.

Figure 3C:
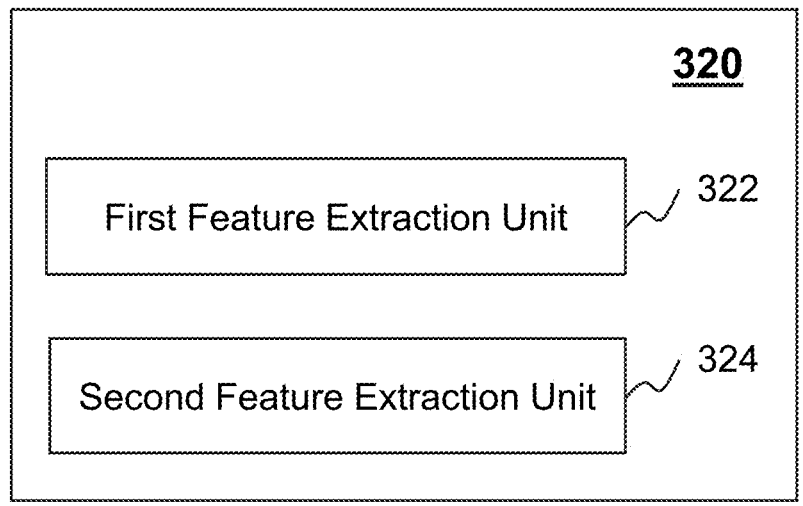
FIG. 3C is a block diagram of an exemplary feature extraction module according to some embodiments of the present disclosure.

FIG. 3C is a block diagram of an exemplary feature extraction module 320 according to some embodiments of the present disclosure. The feature extraction module 320 may include a first feature extraction unit 322 and a second feature extraction unit 324.

The first feature extraction unit 322 may extract first feature data relating to the target route or first training feature data relating to the plurality of historical routes. The first feature data relating to the target route may include features corresponding to each link of the target route. The first training feature data relating to the plurality of historical routes may include feature data corresponding to each link of each of the plurality of historical routes.

The second feature extraction unit 324 may obtain second feature data relating to the target route and second training feature data relating to the plurality of historical routes. The second feature data relating to the target route may include feature data relating to the whole target route. The second training feature data relating to the plurality of historical routes may include feature data relating to each of the plurality of historical routes.

Figure 3D:
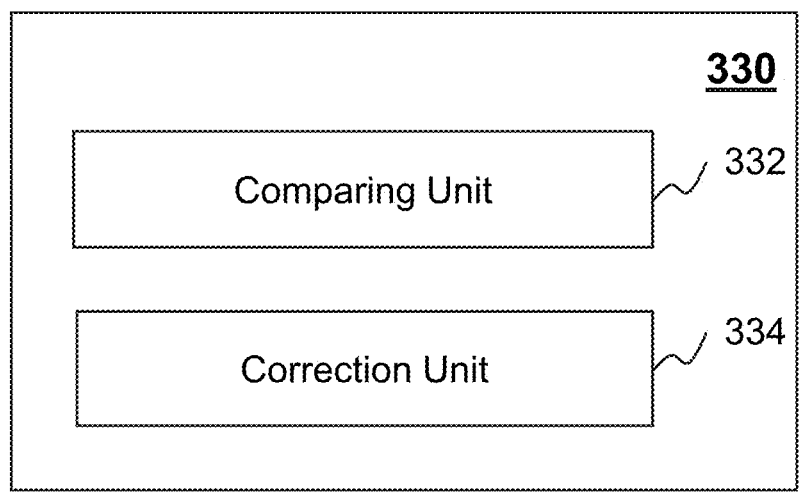
FIG. 3D is a block diagram of an exemplary model obtaining module according to some embodiments of the present disclosure.

FIG. 3D is a block diagram of an exemplary model determination module 330 according to some embodiments of the present disclosure. The model determination module 330 may include a comparing unit 332 and a correction unit 334.

The comparing unit 332 may compare a match result with a predetermined value. For example, the comparing component 410 may compare an error or a loss function generated during training the estimation model with a predetermined value to determine whether the training can be finished.

The correction unit 334 may modify parameters of the estimation model. In some embodiments, the estimation model may include a first sub-model, a second sub-model, and a third sub-model. The correction unit 334 may modify parameters corresponding to the first sub-model, parameters corresponding to the second sub-model, and parameters corresponding to the third sub-model.

Figure 3E:
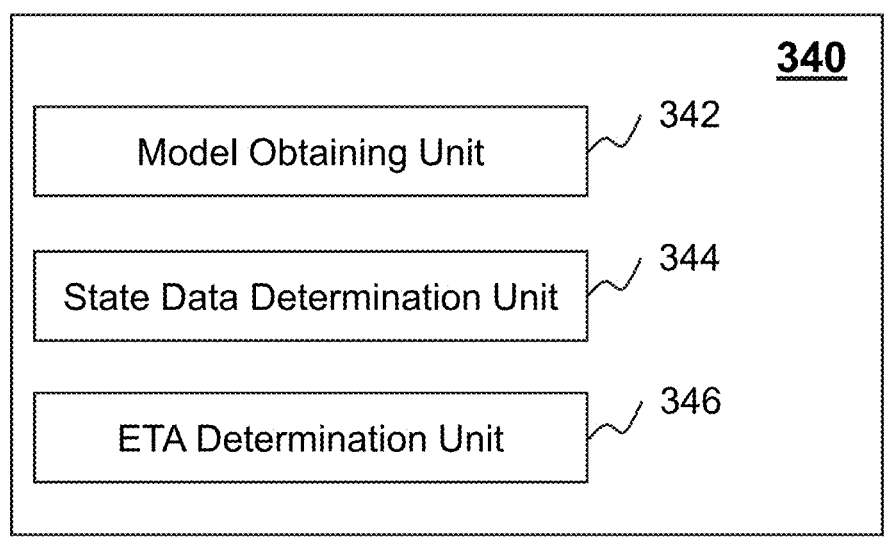
FIG. 3E is a block diagram of an exemplary time estimation module according to some embodiments of the present disclosure.

FIG. 3E is a block diagram of an exemplary time estimation module 340 according to some embodiments of the present disclosure. The time estimation module 340 may include a model obtaining unit 342, a state data determination unit 344, and an ETA determination unit 346.

The model obtaining unit 342 may obtain an estimation model from the storage 150.

The state data determination unit 344 may determine first cell state data, first hidden state data, second cell state data and second hidden state data. In some embodiments, the state data determination unit 344 may determine the first cell state data and the first hidden state data based on the first feature data relating to target route and the first sub-model. The state data determination unit 344 may determine the second cell state data and the second hidden state data based on the second feature data relating to target route and the second sub-model.

The ETA determination unit 346 may determine an ETA relating to the target route. In some embodiments, the ETA determination unit 346 may determine the ETA relating to the target route based on the second cell state data, the second hidden state data and the third sub-model.

Figure 4:
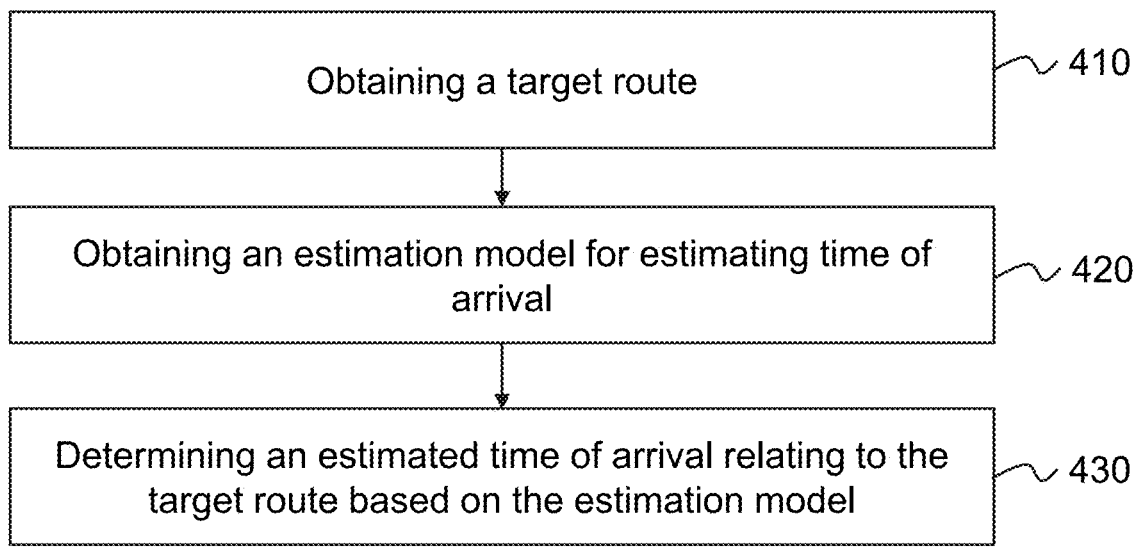
FIG. 4 is a flowchart of an exemplary process for determining an estimated time of arrival relating to a target route according to some embodiments of the present disclosure.

FIG. 4 is a flowchart of an exemplary process 400 for determining an estimated time of arrival relating to a target route according to some embodiments of the present disclosure. In some embodiments, the process 400 for determining the estimated time of arrival relating to the target route may be implemented in the system 100 as illustrated in FIG. 1. In some embodiments, the process 400 may be implemented as one or more sets of instructions stored in storage 150 and called and/or executed by the processing engine 112 or the processor 300. In some embodiments, the process 400 may be implemented in a user terminal and/or a server.

At 410, the processor 300 (e.g., the route obtaining module 310) may obtain information related to a target route. The target route may be a route from one location to one or more other locations. In some embodiments, the target route may be a route of an order initiated by a user (e.g., a passenger) via the requester terminal 130. The order may include a starting location and a destination. The target route may be a route between the starting location and the destination.

In some embodiments, information and/or data associated with the target route may include a starting location, a destination, the starting time, the number of links of the target route, the distance of the target route, date data relating to the target route, traffic data, user data relating to the target route, speed data relating to the target route, travel mode data relating to the target route, or the like, or any combination thereof. The distance of the target route may include a distance between the starting location and the destination. In some embodiments, the distance between two locations in the present disclosure may refer to a length of a route between the two locations. The date data may include a year, a month, a day (e.g., a weekday, a weekend, a holiday), or the like. The traffic data may include traffic information, an average speed of traffic, vehicle flow or the like, or any combination thereof. The user data relating to the target route may include information and/or data about one or more users that may provide services related to the target route, such as a driver that can fulfil a service order related to the target route. The user data may include, for example, an user identifier, a name, a nickname, a gender, an age, a telephone number, an occupation, a rank, time of use, driving experience, a vehicle age, a license plate number, a driver's license number, a certification status, user habits/preferences (e.g., a driving speed), additional service capabilities (additional features such as the size of the trunk of the car, a panoramic sunroof) or the like, or any combination thereof. The speed data relating to the target route may include a maximum speed limit in the target route, a minimum speed limit in the target route, an average driving speed associated with a user. A vehicle relating to the travel model may include a horse, a carriage, a rickshaw (e.g., a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof. The information and/or data relating to the target route may be stored in the one or more user terminals (e.g., the one or more requester terminals 130 or the one or more provider terminals 140). In some embodiments, the information and/or data relating to the target route may be stored in the storage 150. The information and/or data relating to the target route may further be accessed by the server 110 via the network 120.

At 420, the processor 300 (e.g., the model obtaining unit 342 in the time estimation module 340) may obtain an estimation model for determining an ETA related to the target route. In some embodiments, the estimation model may be generated and/or trained in advance, and stored in a storage device (e.g., the storage 150). The processor 300 may obtain the estimation model from the storage 150. Alternatively or additionally, the estimation model can be trained and/or updated in real time. The estimation model may be trained using one or more machine learning techniques. In some embodiments, the estimation model can be obtained by performing one or more operations described in connection with FIGS. 6 and 7.

At 430, the processor 300 (e.g., the time estimation module 340) may determine an ETA relating to the target route based on the estimation model. In some embodiments, the processor 300 may determine a travel time for the target route. The travel time for the target route may refer to a total estimated amount of time spent while traveling from the starting location and the destination of the target route. Then the processor 300 may determine the ETA based on the travel time and the starting time relating to the target route. In some embodiments, the starting time may be designated by a user through the user terminal.

In some embodiments, the processor 300 may determine an ETA relating to a route of an order for multiple users (e.g., multiple active drivers that can provide transportation services). Different ETAs may be determined for different users based on user data related to the users (e.g., different drivers' average driving speed may differ). For example, the processor 300 can determine a first ETA and a second ETA for the same target route for a first user and a second user, respectively. The first ETA can be less than the second ETA in some embodiments in which a first driving speed (e.g., an average driving speed) associated with the first user is higher than that of the second user. In some embodiments, the processor 300 may determine an ETA relating to the target order without considering the user data associated with different users.

In some embodiments, based on the ETA, the processor 300 may determine a suitable user (e.g., a driver) to fulfill the target order. In some embodiments, the processor 300 may determine an ETA relating to a route of an order (also referred to herein as the "current order") that is being performed by a current driver. Based on the ETA relating to the route of the current order, the processor 300 may determine whether a new order is suited to allocate to the current driver to fulfill the new order.

In some embodiments, the processor 300 may determine whether two or more orders can be combined based on at least one ETA relating to at least one of the two or more orders. For example, the processor 300 may receive a first order from a first service requester and a second order from a second service requester via their respective terminal. The first order may include a first starting location, a first destination location, and a first starting time. The second order may include a second starting location, a second destination, and a second starting time. The first starting time is earlier than the second starting time. The processor 300 may determine a first ETA relating to a route between the first starting location and the first destination. The processor 300 may also determine a second ETA relating to a route between the first destination and the second starting location. The processor 300 may determine whether to combine the first order and the second order together based on the first ETA, or the second ETA, or both. If the processor 300 determines that the first order and the second order can be combined, the processor 300 may allocate the first order and the second order to the same driver.

FIG. 5A is a flowchart of another exemplary process 500 for determining an ETA relating to a target route according to some embodiments of the present disclosure. In some embodiments, the process 500 may be implemented in the system 100 as illustrated in FIG. 1. In some embodiments, the process 500 may be implemented as one or more instructions stored in the storage 150 and called and/or executed by the processing engine 112 or the processor 300.

In some embodiments, the process 500 may be implemented in a user terminal and/or a server.

At 510, the processor 300 (e.g., the route obtaining module 310) may obtain a target route associated with a user. In some embodiments, the target route may include a route from one location to one or more other locations. In some embodiments, the target route may be associated with an order initiated by the user (e.g., a passenger) via the requester terminal 130. The order may include a starting location and a destination. The processor 300 may determine a route based on the starting location and the destination.

At 520, the processor 300 (e.g., the feature extraction module 320) may extract characteristic data relating to the target route. The target route can be divided into one or more links based on digital map data related to the target route (e.g., a digital map of the target route). Each link of the target route may be a portion of the target route. In some embodiments, the target route may be divided into multiple links based on one or more predetermined computer-implemented rules. In some embodiments, the target route may be divided into multiple links using different techniques.

In some embodiments, the characteristic data of the target route may include first feature data. The first feature extraction unit 322 in the feature extraction module 320 may extract first feature data relating to the target route. The first feature data relating to the target route may include feature data corresponding to each link. The feature data corresponding to a link may include a start point of the link, an end point of the link, identifying data relating to the link (e.g., an identification), data about one or more traffic lights relating to the link, data about one or more intersections relating to the link, a distance of the link, timing data relating to the link, traffic data relating to the link, user data relating to the link, speed data relating to the link, travel mode data relating to the link, or the like, or any combination thereof. The identifying data of the link may include any information that can be used to identify the link, such as a unique identifier of the link. The distance of each link may include a distance between the start point and the end point of each link. In some embodiments, the distance between two locations may refer to a length of a route between the two locations. The timing data relating to each link may include a year, a month, a day (e.g., a weekday, a weekend, a holiday), a time instant, or the like. The traffic data relating to each link may include a condition of jam, an average speed of traffic, human traffic, vehicle traffic, or the like, or a combination thereof. The user data relating to each link may include information and/or data about a user that may fulfill an order relating to the link. The information and/or data about a user may include a user identifier, a name, a nickname, a gender, an age, a telephone number, an occupation, a rank, time of use, driving experience, a vehicle age, a license plate number, a driver's license number, a certification status, user habits/preferences (a usual speed of driving), additional service capabilities (additional features such as the size of the trunk of the car, a panoramic sunroof) or the like, or any combination thereof. The speed data relating to each link may include a maximum speed limit in each link, a minimum speed limit in each link, an average driving speed associated with a user in each link. A vehicle relating to the travel model relating to each link may include a horse, a carriage, a rickshaw (e.g., a, a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof. The data about one or more traffic lights relating to each link may include the number of the traffic lights of the link, a status of the traffic lights of the link, or the like. The data about one or more intersections relating to each link may include the number of the intersections of the link, the traffic data of intersections of the link, or the like.

In some embodiments, the first feature data of the target route may be a time sequence composed by feature data corresponding to each link of the target route in time order.

In some embodiments, the characteristic data may further include second feature data. The second feature extraction unit 324 in the feature extraction module 320 may extract second feature data relating to the target route. The second feature data of the target route may include feature data about a whole target route. For example, the second feature data may include a starting location of the target route, a destination of the target route, a distance of the target route, data about one or more traffic lights relating to the target route, the number of links of the target route, data about one or more intersections in the target route, timing data relating to the target route, traffic data, user data relating to the target route, speed data relating to the target route, travel mode data relating to the target route, or the like, or any combination thereof. The distance of the target route may refer to a distance between the starting location and the destination of the target route. The timing data relating to the target route may include a year, a month, a day (e.g., a weekday, a weekend, a holiday), a time instant, or the like. The traffic data relating to the target route may include traffic information, an average speed of traffic, vehicle flow, or the like, or any combination thereof. The user data relating to the target route may include information and/or data about one or more users that may provide services related to the target route, such as a driver that can fulfill a service order related to the target route. The user data relating to the target route may include, for example, a user identifier, a name, a nickname, a gender, an age, a telephone number, an occupation, a rank, time of use, driving experience, a vehicle age, a license plate number, a driver's license number, a certification status, user habits/preferences, additional service capabilities (additional features such as the size of the trunk of the car, a panoramic sunroof) or the like, or any combination thereof. The speed data relating to the target route may include a maximum speed limit in the target route, a minimum speed limit in the target route, an average driving speed associated with a user in the target route. A vehicle relating to the travel model relating to the target route may include a horse, a carriage, a rickshaw (e.g., a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof. The data about one or more traffic lights relating to the target route may include the number of the traffic lights in the target route, a status of the traffic lights in the target route, or the like. The data about one or more intersections relating to the target route may include the number of the intersections in the target route, traffic data of the intersections in the target route, or the like.

At 530, the processor 300 (e.g., the model obtaining unit 342 in the time estimation module 340) may obtain an estimation model. In some embodiments, the estimation model can be obtained by performing one or more operations described in connection with FIGS. 6 and 7.

In some embodiments, the estimation model may include a first sub-model and a second sub-model. The first sub-model and/or the second sub-model may include a recurrent neural network model, a convolutional network model, a hidden Markov model, a perceptron neural network model, a Hopfield network model, a self-organizing map (SOM), or a learning vector quantization (LVQ), or the like, or any combination thereof. The recurrent neural network model may include a long short term memory (LSTM) neural network model, a hierarchical recurrent neural network model, a bi-direction recurrent neural network model, a second order recurrent neural network model, a fully recurrent network model, an echo state network model, a multiple timescales recurrent neural network (MTRNN) model, etc. In some embodiments, the first sub-model may be different from the second sub-model. In some embodiments, the first sub-model may be the same with the second sub-model. For example, both the first sub-model and the second sub-model may include an LSTM neural network model.

The LSTM neural network model may receive an input sequence of feature vectors and generate an output sequence for the input sequence in accordance with a set of parameters of the LSTM neural network model. The set of parameters of the LSTM neural network model may be trained by performing one or more operations described in connection with FIGS. 6 and 7.

Figure 5B:
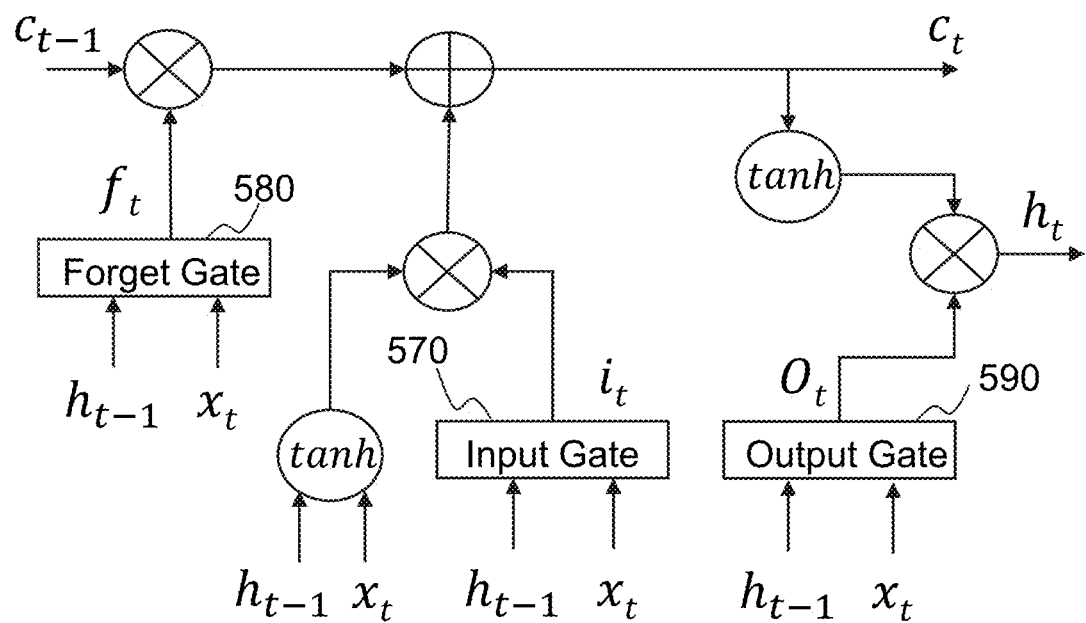
FIG. 5B is a block diagram of an exemplary LSTM block according to some embodiments of the present disclosure.

FIG. 5B shows an example of LSTM block. In some embodiments, the LSTM neural network model may include one or more LSTM blocks, while only one LSTM block is shown in FIG. 5B for clarity. In some embodiments, the LSTM block may include an input gate 570, a forget gate 580, and an output gate 590. The LSTM block may receive $x_t$, an LSTM output $h_{t-1}$, and a cell state value $c_{t-1}$. The LSTM block may generate an LSTM output $h_t$ and a cell state value $c_t$ for $x_t$. In some embodiments, $x_t$ may be the feature data corresponding to the tth link of the target route. The LSTM output $h_{t-1}$ may be an output of the LSTM block corresponding to the (t−1)th link of the target route. The cell state value $c_{t-1}$ may be a cell state value corresponding to the (t−1)th link of the target route. In some embodiments, $x_t$ may be a vector. In some embodiments, the vector may be a combination of a cell state value and an LSTM output. In some embodiments, the vector may be a combination of a cell state value, an LSTM output, and the second feature data corresponding to the target route.

In some embodiments, the LSTM neural network model may determine the cell state value $c_t$ based on Equations (1)-(3) and determine the LSTM output $h_t$ based on the Equations (1)-(5) below:

$$i_t = \sigma(W_i x_t + W_i h_{t-1} + b_i) \tag{1}$$

$$f_t = \sigma(W_f x_t + W_f h_{t-1} + b_f) \tag{2}$$

$$c_t = f_t c_{t-1} + i_t \times \tan h(W_c x_t + W_c h_{t-1} + b_c) \tag{3}$$

$$o_t = \sigma(W_o x_t + W_o h_{t-1} + b_o) \tag{4}$$

$$h_t = o_t \times \tan h(c_t) \tag{5}$$

wherein $i_t$ refers to a result of the input gate, $f_t$ refers to a result of the forget gate, of refers to a result of the output gate, $c_t$ refers to a cell state value corresponding to $x_t$, $c_{t-1}$ refers to a cell state value corresponding to $x_{t-1}$, σ refers to a sigmoid function, tan h refers to a hyperbolic tangent, the symbol "+" refers to element-wise add operations, the symbol "x" refers to element-wise multiplication, $W_i$, $W_f$, $W_c$, and $W_o$ are weight matrixes of the LSTM block, $b_i$, $b_f$, $b_c$, and $b_o$ are bias parameters. In some embodiments, the set of parameters of the LSTM neural network model may include the bias parameters and the weight matrices.

At 540, the processor 300 (e.g., the state data determination unit 344 in the time estimation module 340) may determine first cell state data and first hidden state data based on the first sub-model and the first feature data. In some embodiments, the processor 300 may process the first feature data based on the first sub-model to output the first cell state data and the first hidden state data. More particularly, for example, feature data corresponding to the multiple links of the target route in the time order from the start location and the destination may be inputted in the first sub-model in time order.

In some embodiments, the feature data of the multiple links of the target route can be processed using the first sub-model (e.g., the long short term memory (LSTM) neural network model) in an order determined based on identifications of the multiple links. For example, each link of the target route may have an identification (e.g., a particular building or a monitoring device. Time orders relating to the multiple links of the target route may be determined based on each time point that a vehicle passing through the particular building or the monitoring device relating to each of the multiple links. The processor 300 may generate a first output $h_1$ and first cell state value $c_1$ by processing feature data corresponding to the first link of the target route ($x_1$), initial hidden state data $h_0$, and an initial cell state data $c_0$ using the first sub-model. The initial hidden state data $h_0$ and/or the initial cell state data $c_0$ in the second sub-model may be default data set by the on-demand service system 100, or set by an operator of the on-demand service system 100. Then, feature data corresponding to the second link of the target route ($x_2$), the first cell state value $c_1$, and the first output $h_1$ may be inputted in the first sub-model to generate a second output $h_2$ and a second cell state value $c_2$. The first output $h_1$ and the second output $h_2$ may be determined based on Equations (1)-(5). The first cell state value $c_1$ and the second cell state value $c_2$ may be determined based on the Equations (1)-(3). The feature data of the other links of the target route may be processed in a similar manner. The target route may include N links. The value of N may be any integer from 1 to 100 or larger than 100. The value of N may be 10, 20, 30, etc. When feature data corresponding to the last link of the target route ($x_N$), and the (N−1)th cell state value ($c_{N-1}$), and the (N−1)th output ($h_{N-1}$) is inputted in the first sub-model, a final output of the first sub-model ($h_N$), and a final cell state value of the first sub-model ($c_N$) will be generated. In some embodiments, the first hidden state data may be the final output of the first sub-model ($h_N$), and the first cell state data may be the final cell state value of the first sub-model ($c_N$).

At 550, the processor 300 may determine a first vector based on the first cell state data and the first hidden state data. In some embodiments, the first vector may be a vector determined by combining the first cell state data and the first hidden state data. The first vector may also be determined based on the second feature data corresponding to the target route.

At 560, the processor 300 (e.g., the state data determination unit 344 in the time estimation module 340) may determine second cell state data and second hidden state data based on the first vector and the second sub-model. The second sub-model may be an LSTM neural network model that includes one LSTM block as shown in FIG. 5B. In some embodiments, the processor 300 may generate the second cell state data and the second hidden state data by processing the first vector generated using the second sub-model. In some embodiments, the second sub-model may receive initial hidden state data (marked as $h'_0$) and initial cell state data (marked as $c'_0$). The initial hidden state data $h'_0$ and/or the initial cell state data $c'_0$ in the second sub-model may be default data set by the on-demand service system 100, or set by an operator of the on-demand service system 100. Merely by way of example, the processor 300 may generate an output of the second sub-model (e.g., marked as $h'_1$) and a cell state value (e.g., marked as $c'_1$) of the second sub-model by processing the first vector, the initial hidden state data $h'_0$, and the initial cell state data $c'_0$. The output of the second sub-model may be determined based on Equations (1)-(5). The cell state value of the second sub-model may be determined based on the Equations (1)-(3). The first vector may be input as $x'_1$. The second hidden state data may be the output of the second sub-model ($h'_1$). The second cell state data may be the cell state value of the second sub-model ($c'_1$).

At 570, the processor 300 (e.g., the ETA determination unit 346 in the time estimation module 340) may determine an ETA relating to the target route based on the second cell state data and the second hidden state data. In some embodiments, the estimation model may include a third sub-model. The processor 300 may combine the second cell state data and the second hidden state data generated in 550 into a second vector. The processor 300 may input the second vector to the third sub-model to determine the ETA relating to the target route. In some embodiments, the processor 300 may first determine a travel time from the starting location to the destination of the target route based on the second cell state data and the second hidden state data. The processor 300 may then determine the ETA based on the travel time and the starting time relating to the target route.

Figure 6:
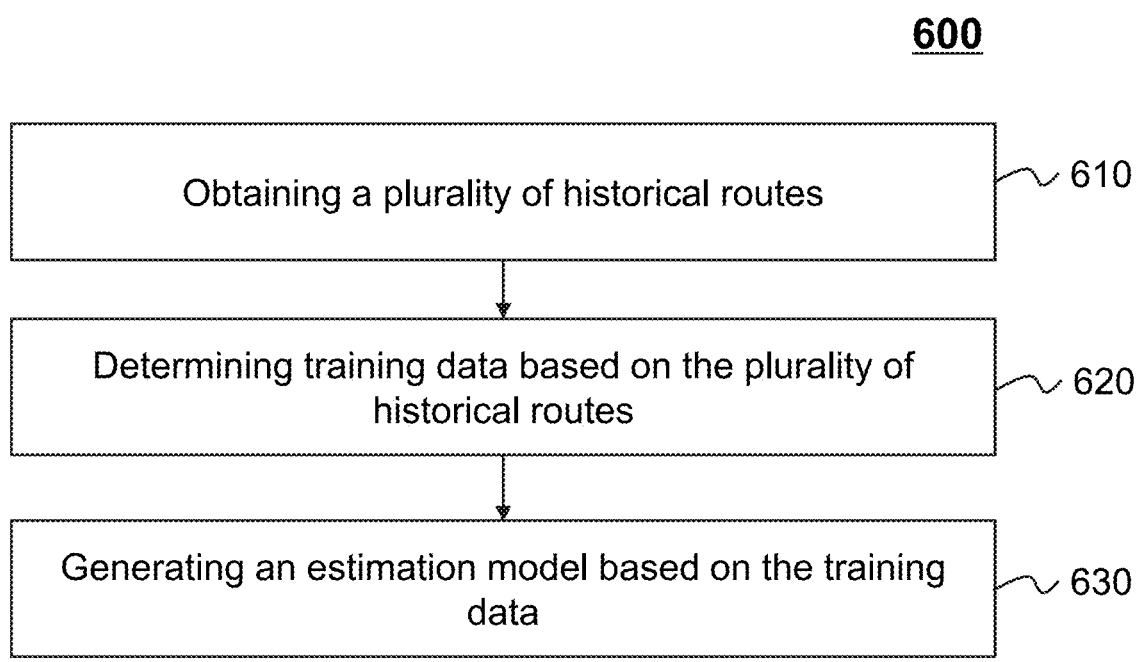
FIG. 6 is a flowchart of an exemplary process for determining an estimation model according to some embodiments of the present disclosure.

FIG. 6 is a flowchart of an exemplary process 600 for determining an estimation model according to some embodiments of the present disclosure. In some embodiments, the process 600 may be implemented in the system 100 as illustrated in FIG. 1. In some embodiments, the process 600 may be implemented as one or more instructions stored in the storage 150 and called and/or executed by the processing engine 112 or the processor 300. In some embodiments, process 600 may be implemented in a user terminal and/or a server.

At 610, the processor 300 (e.g., the historical route obtaining unit 314 in the route obtaining module 310) may obtain a plurality of historical routes. The historical routes may also be referred to herein as training routes. In some embodiments, the processor 300 may obtain the plurality of historical routes from the storage 150. Each of the plurality of historical routes may include a route from one location to one or more other locations. In some embodiments, the plurality of historical routes may be obtained according to one or more historical orders. In some embodiments, the historical orders may be associated with particular users of an online service platform (e.g., a certain number of drivers of a transportation service platform, drivers that are available to provide services at a particular time). The plurality of historical routes may include routes during a particular time period, e.g., the last two months, the last six months, the last ten months, the last one year, the last two years. The plurality of historical routes may include routes on weekends or workdays. As another example, the plurality of historical routes may include orders during a given time of day (e.g., in the morning, in the afternoon, in the night). The plurality of historical routes may include routes in one or more particular places (e.g., a city, a district of a city). In some embodiments, the number of links relating to each of the training routes may satisfy one or more conditions. For example, the number of links may be less than a first threshold. As another example, the number of links may be greater than a second threshold. As still another example, the number of links may fall within a range (e.g., a range between the first threshold and the second threshold). As yet another example, the difference between the greatest number of links relating to each of the training routes and the least number of links relating to the training routes does not exceed a preset threshold value. The preset threshold value may be any reasonable value.

The processor 300 may obtain information and/or data about the plurality of historical routes from the storage 150. The information and/or data relating to the plurality of historical routes may also be accessed by the server 110 via the network 120. In some embodiments, the information and/or data relating to the plurality of historical routes may be stored in the user terminal (e.g., the requester terminals 130 or the provider terminal 140). For example, the information and/or data relating to the plurality of historical routes may usually be generated and recorded in location-based service (LBS) applications (e.g., a service providing application, a driving application, a map application, a navigation application, a social media application). As another example, the information and/or data related to the plurality of historical routes may be recorded by the historical map information downloaded by the LBS applications.

In some embodiments, the information and/or data relating to each of the plurality of historical routes may include characteristic data of the historical route (also referred to herein as "historical characteristic data"). The historical characteristic data may include feature data corresponding to one or more links of a route relating to each of the plurality of historical routes (also referred to herein as the "first training feature data"). The first training feature data relating to the historical route may include feature data corresponding to each link of the historical route. The feature data corresponding to a link of the historical route may include a start point relating to the link of the historical route and an end point of the link of the historical route. The feature data corresponding to the link may also include the identification data relating to the link of the historical route (e.g., an identification), data about one or more traffic lights relating to the link of the historical route, data about one or more intersections relating to the link of the historical route, timing data relating to the link of the historical route, traffic data relating to the link of the historical route, user data relating to the link of the historical route, a distance of the link of the historical route, speed data relating to the link of the historical route, travel mode data relating to the link of the historical route, or the like, or any combination thereof. The identification data of the link of the historical route may include any information that can be used to identify the link of the historical route, such as a unique identifier of the link of the historical route. The timing data relating to each link of the historical route may include a year, a month, a day (e.g., a weekday, a weekend, a holiday), or the like. The traffic data relating to each link of the historical route may include traffic information, an average speed of moving, vehicle flow, or the like, or a combination thereof. The user data relating to each link of the historical route may include information and/or data about a user that may fulfill an order relating to the link of the historical route. The information and/or data about a user may include an identity symbol, a name, a nickname, a gender, an age, a telephone number, an occupation, a rank, time of use, driving experience, a vehicle age, a license plate number, a driver's license number, a certification status, user habits/preferences (e.g., a driving speed), additional service capabilities (additional features such as the size of the trunk of the car, a panoramic sunroof) or the like, or any combination thereof. The distance of each link of the historical route may include a distance between the start point and the end point of each link of the historical route. In some embodiments, the distance between two locations may refer to a length of a route between the two locations. The speed data relating to each link of the historical route may include a maximum speed limit in each link of the historical route, a minimum speed limit in each link of the historical route, an average driving speed associated with a user in each link of the historical route. A vehicle relating to the travel model relating to each link of the historical route may include a horse, a carriage, a rickshaw (e.g., a, a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof. The data about traffic lights relating to each link of the historical route may include the number of the traffic lights of the link, a status of the traffic lights of the link, or the like. The data about one or more intersections relating to each link of the historical route may include the number of the intersections of the link of the historical route, the traffic data of intersections of the link of the historical route, or the like.

In some embodiments, the historical characteristic data may also include feature data relating to each of the plurality of historical routes (also referred to herein as the "second training feature data"). The second training feature data relating to a historical route may include a starting location of the historical route, a destination of the historical route, data about one or more traffic lights relating to the historical route, the number of links of the historical route, data about one or more intersections in the historical route, timing data relating to the historical route, traffic data, user data relating to the historical route, a distance of the historical route, speed data relating to the historical route, travel mode data relating to the historical route, or the like, or any combination thereof. The timing data may include a year, a month, a day (e.g., a weekday, a weekend, a holiday), a time instant, or the like. The traffic data may include traffic information, an average speed of traffic, vehicle flow, or the like, or any combination thereof. The user data relating to the historical route may include information and/or data about a user that may drive a vehicle to perform the target route, e.g., a user identifier, a name, a nickname, a gender, an age, a telephone number, an occupation, a rank, time of use, driving experience, a vehicle age, a license plate number, a driver's license number, a certification status, user habits/preferences (e.g., a driving speed), additional service capabilities (additional features such as the size of the trunk of the car, a panoramic sunroof) or the like, or any combination thereof. The distance of the historical route may include a distance between the starting location and the destination of the historical route. The speed data relating to the historical route may include a maximum speed limit in the historical route, a minimum speed limit in the historical route, an average driving speed associated with a user in the historical route. A vehicle relation to the travel model may include a horse, a carriage, a rickshaw (e.g., a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof. The data about one or more traffic lights may include the number of the traffic lights, a status of the traffic lights, or the like. The data about one or more intersection may include the number of the intersections, the traffic data of intersections, or the like.

The processor 300 may also obtain the time of arrival relating to each of the plurality of historical routes (also referred to herein as "historical time of arrival data"). The time of arrival data relating to each of the plurality of historical routes may be an actual time at which a historical route was completed.

At 620, the processor 300 may generate training data based on data about the plurality of historical routes. In some embodiments, the training data may include historical characteristic data and historical time of arrival data relating to the training routes. At 630, the processor 300 (e.g., the model determination module 330) may generate the estimation model based on the training data. In some embodiments, the plurality of training routes may be used to train the estimation model in a random order. In some embodiments, the plurality of training routes may be used to train the estimation model in a chronological order of the ending times of plurality of training routes. The ending time of a training route may be a time point when the training route was finished. For example, the processor 300 may further include a sort module. The processor 300 (e.g., the sort module) may sort the training routes according to a chronological order of the ending times of the training routes after obtaining the plurality of training routes. The processor 300 may then feed and train a preliminary model using the sorted training routes according to the ending time of each of the training routes to generate the estimation model. Additionally or alternatively, the processor 300 may obtain the plurality of historical routes according to the ending times of the plurality of historical routes in 610. Then the processor 300 may feed and train the preliminary model using the training routes according to the time of being obtained to generate the estimation model. Merely by way of example, historical characteristic data of a training route having an earlier ending time may be inputted into the preliminary model earlier than historical characteristic data of a training route having a later ending time.

Figure 7:
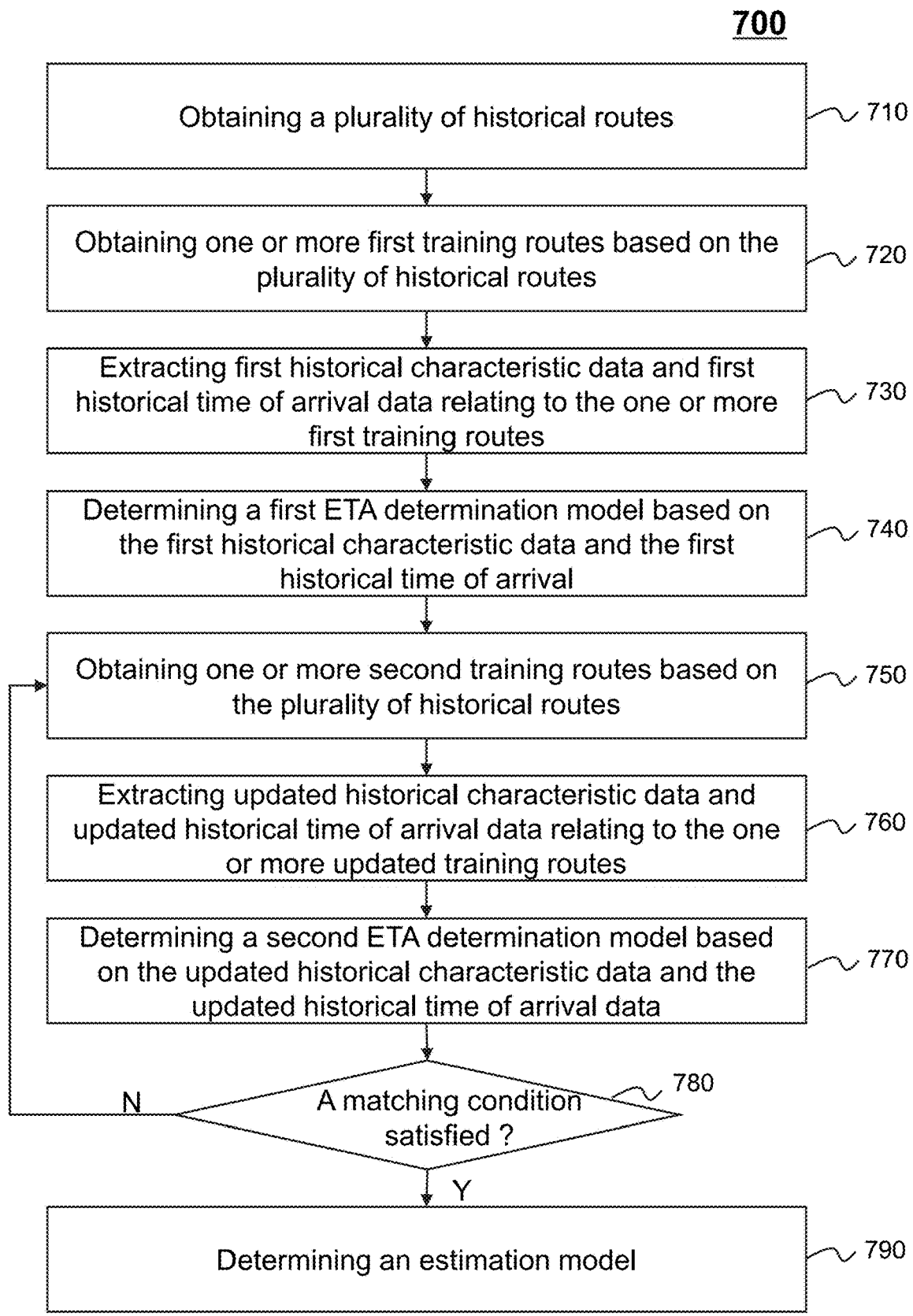
FIG. 7 is a flowchart of another exemplary process for determining an estimation model according to some embodiments of the present disclosure.

FIG. 7 is a flowchart of an exemplary process 700 for determining the estimation model according to some embodiments of the present disclosure. In some embodiments, the process 700 for determining the estimation model may be implemented in the system 100 as illustrated in FIG. 1. In some embodiments, the process 700 may be implemented as one or more instructions stored in the storage 150 and called and/or executed by the processing engine 112 or the processor 300. In some embodiments, the process 700 may be implemented in a user terminal and/or a server.

At 710, the processor 300 (e.g., the historical route obtaining unit 314 in the route obtaining module 310) may obtain a plurality of historical routes. For example, one or more operations described in connection with step 610 may be performed.

At 720, the processor 300 (e.g., the historical route obtaining unit 314 in the route obtaining module 310) may obtain one or more first training routes based on the plurality of historical routes. In some embodiments, the processor 300 may select one or more routes from the plurality of historical routes as the first training routes. For example, the processor 300 may select one or more routes occurred in a particular period of time (e.g., one year, one month, one day) from the plurality of historical routes as the first training routes. Each historical route may correspond to an ending time. In some embodiments, the processor 300 may sort the plurality of historical routes according to a chronological order of the ending times of the historical routes after obtaining the plurality of historical routes. The first training routes may be the routes corresponding to a plurality of earliest ending times. For example, ending times of the plurality of historical routes may be in time periods A, B, C, etc. Time period A is earlier than time period B, and time period B is earlier than time period C. The first training routes may include routes corresponding to time period A.

At 730, the processor 300 (e.g., the feature extraction module 320) may extract first historical characteristic data and first historical time of arrival data relating to the one or more first training routes. In some embodiments, the first historical characteristic data may include feature data corresponding to one or more links of a route relating to each of the one or more first training routes. In some embodiments, the first historical characteristic data may also include feature data corresponding to each of the one or more first training routes. The first historical time of arrival data may include historical time of arrival corresponding to each of the one or more first training routes.

At 740, the processor 300 (e.g., the model determination module 330) may determine a first ETA determination model based on the first historical characteristic data and the first historical time of arrival.

The first ETA determination model may include the first sub-model, the second sub-model, and the third sub-model. The first sub-model and the second sub-model may include a recurrent neural network model, a convolutional network model, a hidden Markov model, a perceptron neural network model, a Hopfield network model, a self-organizing map (SOM), or a learning vector quantization (LVQ), or the like, or any combination thereof. The recurrent neural network model may include a long short term memory (LSTM) neural network model, a hierarchical recurrent neural network model, a bi-direction recurrent neural network model, a second order recurrent neural network model, a fully recurrent network model, an echo state network model, a multiple timescales recurrent neural network (MTRNN) model, etc. The third sub-model may include a multilayer perceptron neural network model.

In some embodiments, before the processor 300 determine the first ETA determination model, the processor 300 may obtain a preliminary ETA determination model with a set of initialization parameters from a storage device (e.g., the storage 150). In some embodiments, the one or more first training routes may be sorted in a chronological order according to the ending times of the one or more first training routes. The first historical characteristic data may be inputted in the preliminary ETA determination model according to the chronological order of the ending times of the one or more first training routes. Merely by way of example, historical characteristic data of a first training route having an earlier ending time may be inputted into the preliminary ETA determination model earlier than historical characteristic data of a first training route having a later ending time. For each of the first training route, the processor 300 may determine estimated time of arrival data. In some embodiments, the processor 300 (e.g., the correction unit 334 in the model determination model 330) may modify at least one initialization parameters in the preliminary ETA determination model based on the estimated time of arrival data and the first historical time of arrival data relating to the first training routes to determine the first ETA determination model.

At 750, the processor 300 (e.g., the route obtaining module 310) may obtain one or more second training routes based on the plurality of historical routes. In some embodiments, the processor 300 may select one or more routes from the historical routes as second training routes. In some embodiments, the ending times of the second training routes may be later than the ending times of the first training routes.

At 760, the processor 300 (e.g., the feature extraction module 320) may extract second historical characteristic data and second historical time of arrival data relating to the one or more second training routes. In some embodiments, the second historical characteristic data may include feature data corresponding to one or more links of a route relating to each of the one or more second training routes. In some embodiments, the second historical characteristic data may also include feature data corresponding to each of the one or more second training routes. The second historical time of arrival data may include historical time of arrival corresponding to each of the one or more second training routes.

At 770, the processor 300 (e.g., the model determination module 330) may determine a second ETA determination model based on the second historical characteristic data and the second historical time of arrival data. In some embodiments, the processor 300 (e.g., the correction unit 334 in the model determination module 330) may modify at least one parameter in the first ETA determination model based on the second characteristic data and the second historical time of arrival data to determine the second ETA determination model. In some embodiments, the second historical characteristic data may be inputted into the first ETA determination model based on the ending times of the one or more second training routes. Merely by way of example, the historical characteristic data of a second training route having an earlier ending time may be inputted into the first ETA determination model earlier than the historical characteristic data of a second training route having a later ending time.

At 780, the processor 300 (e.g., the comparing unit 332 in the model determination module 330) may determine whether a matching condition is satisfied. In some embodiments, if the matching condition is satisfied, the processor 300 may determine the second ETA determination model as the estimation model. If the matching condition is not satisfied, the processor 300 may perform step 750 to step 780 again to obtain new training routes to train the model to determine the estimation model.

In some embodiments, the matching condition may include determining whether a loss function converges to a first value. The loss function may be determined based on at least one of the first ETA determination model or the second ETA determination model. For example, if the loss function converges to the first value, the processor 300 may determine the second ETA determination model as the estimation model at 790. If the loss function does not converge to the first value, the processor 300 may go back to 750 again.

In some embodiments, the matching condition may include determining whether an error is less than a second value. The error may be determined based on one or more third historical routes (also referred to as "testing routes") from the plurality of the historical routes and the second ETA determination model. The one or more third historical routes may be different from the first training routes and the second training routes. The processor 300 (e.g., the feature extraction module 320) may extract characteristic data relating to the testing routes (also referred to herein as "third historical characteristic data") and time of arrival relating to the one or more third historical routes (also referred to herein as "third historical time of arrival data"). The third historical characteristic data may include feature data corresponding to one or more links of a route relating to each of the one or more third routes and feature data corresponding to each of the one or more third routes. Based on the third historical characteristic data and the second ETA determination, the processor 300 may determine an ETA relating to the one or more third historical routes. Then the processor 300 may determine the error between the ETA relating to the one or more third routes and the third historical time of arrival data relating to the one or more third routes. If the error is less than the second value, the processor 300 may determine the second ETA determination model as the estimation model at 790. If the error is not less than the second value, the processor 300 may loop back to 750.

In some embodiments, the matching condition may include determining whether the error is less than the second value and determining whether the loss function converges to the first value. The second value and the loss function may be any reasonable value.

It should be noted that the above description about the process 700 for determining an estimation model is merely an example, and is not intended to be limiting. In some embodiments, some steps of the process 700 may be changed. For example, in 710, the processor 300 may obtain the plurality of historical routes according to the chronological order of the ending times of the plurality of historical routes directly. Then the processor 300 may select first training routes according to the time of being obtained in 720. In 750, the processor 300 may select one or more training routes with the times of being obtaining following the first training routes.

Figure 8:
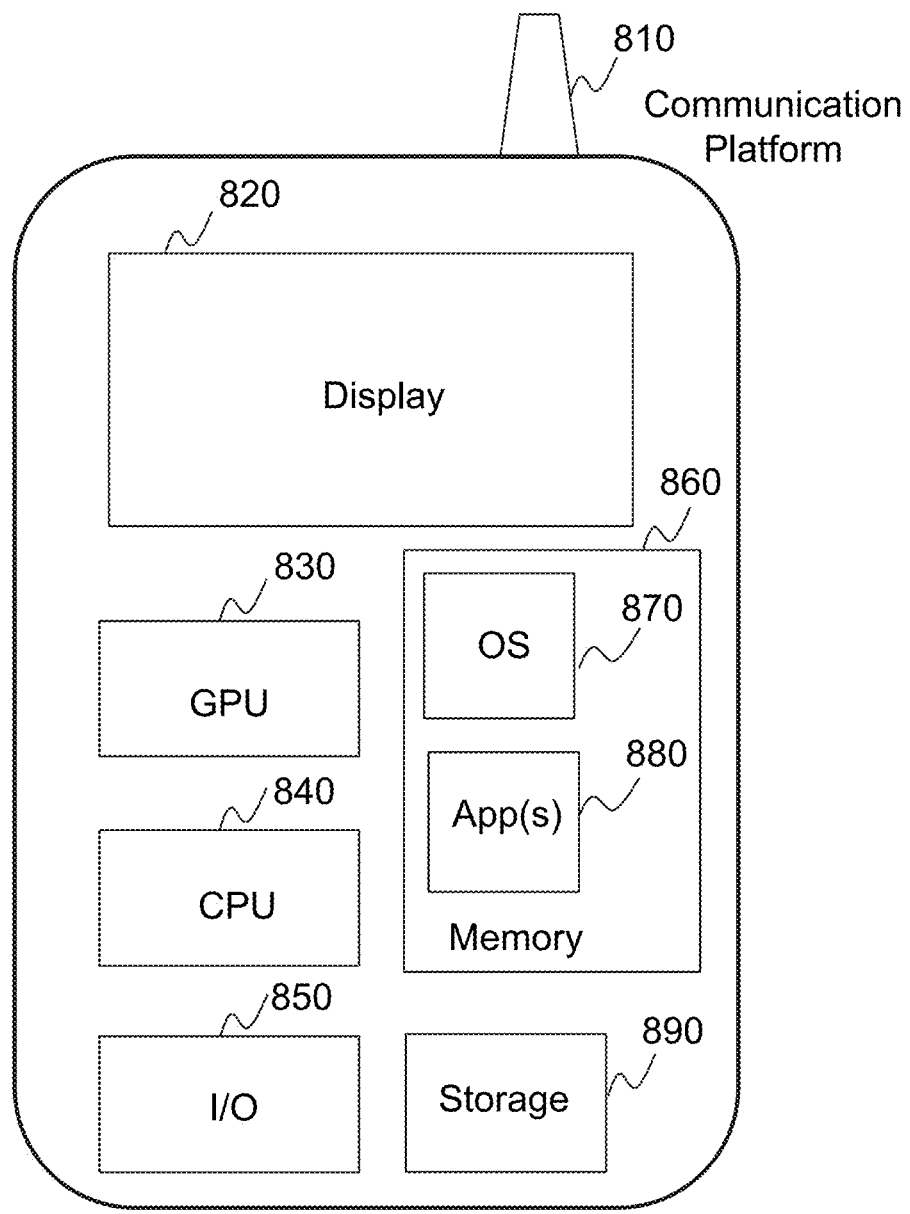
FIG. 8 is a schematic diagram of an exemplary mobile device according to some embodiments of the present disclosure.

FIG. 8 is a schematic diagram illustrating exemplary hardware and/or software components of an exemplary mobile device 800 on which the requester terminal 130 or the provider terminal 140 may be implemented according to some embodiments of the present disclosure. As illustrated in FIG. 8, the mobile device 800 may include a communication platform 810, a display 820, a graphic processing unit (GPU) 830, a central processing unit (CPU) 840, an I/O 850, a memory 860, and a storage 890. In some embodiments, any other suitable component, including but not limited to a system bus or a controller (not shown), may also be included in the mobile device 800. In some embodiments, a mobile operating system 870 (e.g., iOS™, Android™, Windows Phone™) and one or more applications 880 may be loaded into the memory 860 from the storage 890 in order to be executed by the CPU 840. The applications 880 may include a browser or any other suitable mobile apps for receiving and rendering information relating to monitoring an on-demand service or other information from, for example, the processing engine 112. User interactions with the information stream may be achieved via the I/O 850 and provided to the processing engine 112 and/or other components of the on-demand service system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
    at least one computer-readable storage medium including a set of instructions; and
    at least one processor in communication with the at least one computer-readable storage medium, wherein when executing the set of instructions, the at least one processor is caused to:
        obtain a target route associated with a user, the target route including multiple links, each link of the target route being a portion of the target route;
        determine characteristic data relating to the target route, wherein the characteristic data includes first feature data including a time sequence composed by feature data corresponding to each link of the multiple links arranged in a time order and second feature data corresponding to a whole of the target route;
        obtain an estimation model, wherein the estimation model includes a first sub-model and a second sub-model each of which includes a trained neural network model;
        determine first cell state data and a first output of the first sub-model corresponding to each link of the target route based on the first feature data and the first sub-model, wherein
            the first sub-model is configured to determine at least one of the first cell state data or the first output corresponding to a link in the time order based on at least one of the first output or the first cell state data corresponding to a previous link in the time order;
        determine a first vector based on the first cell state data and the first output of the first sub-model, the first vector including a combination of the first cell state data and the first output corresponding to the multiple links, and the second feature data;
        determine second cell state data and a second output of the second sub-model corresponding to the whole of the target route based on the second feature data, the first vector, and the second sub-model; and
        determine an estimated time of arrival (ETA) of the user arriving at a destination when the user travels along the target route based on the second cell state data and the second output of the second sub-model.

2. The system of claim 1, wherein the estimation model further includes a third sub-model, determining the ETA of the user arriving at a destination when the user travels along the target route, wherein the at least one processor is further caused to:
  determine a second vector based on the second cell state data and the second output; and
  determine the ETA based on the second vector and the third sub-model.

3. The system of claim 2, wherein the third sub-model comprises a multi-layer perceptron (MLP) neural network model.

4. The system of claim 1, wherein when obtaining the estimation model, the at least one processor is further caused to:
  obtain the estimation model from a storage device, wherein the estimation model stored in the storage device is generated by operations including:
    obtain a plurality of historical routes and historical times of arrival of particular users arrived at destinations when the particular users traveled along the plurality of historical routes;
    determine historical characteristic data of each of the plurality of historical routes, wherein the historical characteristic data includes first training feature data corresponding to at least a portion of each of the plurality of historical routes; and
    generate the estimation model based on the first training feature data and the historical times of arrival of users arrived at the destinations when the users traveled along the plurality of historical routes.

5. The system of claim 4, wherein the historical characteristic data further includes second training feature data corresponding to each of the plurality of historical routes, and the generating the estimation model based on the first training feature data and the historical times of arrival of users arrived at destinations when the users traveled along the plurality of historical routes includes:
  generating the estimation model based, at least in part, on the second training feature data.

6. The system of claim 4, wherein the generating the estimation model based on the first training feature data and the historical times of arrival of users arrived at destinations when the users traveled along the plurality of historical routes includes:
  obtaining an ending time of each of the plurality of historical routes;
  sorting the plurality of historical routes according to a chronological order of the ending times of the plurality of historical routes; and
  generating the estimation model based on the sorted plurality of historical routes.

7. The system of claim 1, wherein when obtaining the estimation model, the at least one processor is further caused to:
  obtain the estimation model from a storage device, wherein the estimation model stored in the storage device is generated by operations including:
    obtaining, from a plurality of historical routes, one or more first training routes and one or more second training routes;
    extracting first historical characteristic data and first historical times of arrival of users arrived at destinations when the users traveled along the one or more first training routes;
    determining a first ETA determination model based on the first historical characteristic data and the first historical times of arrival;
    extracting second historical characteristic data and second historical time of arrival of users arrived at destinations when the users traveled along the one or more second training routes;
    determining a second ETA determination model by modifying the first ETA determination model based on the second historical characteristic data and the second historical time of arrival; and
    generating the estimation model based on the first ETA determination model and the second ETA determination model.

8. The system of claim 7, wherein the generating the estimation model based on the first ETA determination model and the second ETA determination model includes:
  determining whether an error is less than a value, the error being determined based on one or more third historical routes and the second ETA determination model; and
  in response to a determination that the error is less than the value, determining the second ETA determination model as the estimation model.

9. The system of claim 8, wherein the generating the estimation model based on the first ETA determination model and the second ETA determination model includes:
  determining a loss function based on at least one of the first ETA determination model or the second ETA determination model;
  determining whether the loss function converges to a first value; and
  in response to a determination that the loss function converges to the first value, determining that the error is less than the value.

10. The system of claim 1, wherein at least one of the first sub-model or the second sub-model comprises a long short term memory (LSTM) neural network model.

11. A method implemented on a computing device having a processor, a storage medium, and a communication platform connected to a network, the method comprising:
  obtaining, by the processor, a target route associated with a user, the target route including multiple links, each link of the target route being a portion of the target route;
  determining, by the processor, characteristic data relating to the target route, wherein the characteristic data includes first feature data including a time sequence composed by feature data corresponding to each link of the multiple links arranged in a time order and second feature data corresponding to a whole of the target route;
  obtaining, by the processor, an estimation model, wherein the estimation model includes a first sub-model and a second sub-model each of which includes a trained neural network model;
  determining, by the processor, first cell state data and a first output of the first sub-model corresponding to each link of the target route based on the first feature data and the first sub-model, wherein
    the first sub-model is configured to determine at least one of the first cell state data or the first output corresponding to a link in the time order based on at least one of the first output or the first cell state data corresponding to a previous link in the time order;
  determine a first vector based on the first cell state data and the first output of the first sub-model, the first vector including a combination of the first cell state data and the first output corresponding to the multiple links, and the second feature data;

determining, by the processor, second cell state data and a second output of the second sub-model corresponding to the whole of the tar et route based on the second feature data, the first vector, and the second sub-model; and determining, by the processor, an estimated time of arrival (ETA) of the user arriving at a destination when the user travels along the target route based on the second cell state data and the second output of the second sub-model.

12. The method of claim 11, wherein the estimation model further includes a third sub-model, and the determining of the ETA of the user arriving at a destination when the user travels along the target route further comprises:

determining a second vector based on the second cell state data and the second output; and determining the ETA based on the second vector and the third sub-model.

13. The method of claim 12, wherein the third sub-model comprises a multi-layer perceptron (MLP) neural network model.

14. The method of claim 11, wherein the estimation model is generated by a process, the process comprising:

obtaining a plurality of historical routes and historical times of arrival of particular users arrived at destinations when the particular users traveled along the plurality of historical routes;

determining historical characteristic data of each of the plurality of historical routes, wherein the historical characteristic data includes first training feature data corresponding to at least a portion of each of the plurality of historical routes; and generating the estimation model based on the first training feature data and the historical times of arrival of users arrived at the destinations when the users traveled along the plurality of historical routes.

15. The method of claim 14, wherein the historical characteristic data further includes second training feature data corresponding to each of the plurality of historical routes, the generating the estimation model based on the first training feature data and the historical times of arrival of users arrived at the destinations when the users traveled along the plurality of historical routes includes:

generating the estimation model based, at least in part, on the second training feature data.

16. The method of claim 14, wherein the generating the estimation model based on the first training feature data and the historical times of arrival of users arrived at the destinations when the users traveled along the plurality of historical routes includes:

obtaining an ending time of each of the plurality of historical routes;

sorting the plurality of historical routes according to a chronological order of the ending times of the plurality of historical routes; and generating the estimation model based on the sorted plurality of historical routes.

17. The method of claim 11, wherein the estimation model is generated by a process, the process further comprising:

obtaining, from a plurality of historical routes, one or more first training routes and one or more second training routes;

extracting first historical characteristic data and first historical times of arrival of particular users arrived at destinations when the users traveled along the one or more first training routes;

determining a first ETA determination model based on the first historical characteristic data and the first historical times of arrival;

extracting second historical characteristic data and second historical times of arrival of users arrived at destinations when the users traveled along the one or more second training routes;

determining a second ETA determination model by modifying the first ETA determination model based on the second historical characteristic data and the second historical times of arrival data;

determining whether an error is less than a value, the error being determined based on one or more third historical routes and the second ETA determination model; and in response to a determination that the error is less than the value, determining the second ETA determination model as the estimation model.

18. A non-transitory computer readable medium, comprising at least one set of instructions, wherein when executed by at least one processor of an electronic terminal, the at least one set of instructions causes the at least one processor to perform acts of:

obtaining a target route associated with a user, the target route including multiple links, each link of the target route being a portion of the target route;

determining characteristic data relating to the target route, wherein the characteristic data includes first feature data including a time sequence composed by feature data corresponding to each link of the multiple links arranged in a time order and second feature data corresponding to a whole of the target route;

obtaining an estimation model, wherein the estimation model includes a first sub-model and a second sub-model each of which includes a trained neural network model;

determining first cell state data and a first output of the first sub-model corresponding to each link of the tar et route based on the first feature data and the first sub-model, wherein the first sub-model is configured to determine at least one of the first cell state data or the first output corresponding to a link in the time order based on at least one of the first output or the first cell state data corresponding to a previous link in the time order;

determining a first vector based on the first cell state data and the first output of the first sub-model, the first vector including a combination of the first cell state data and the first output corresponding to each link, and the second feature data;

determining second cell state data and a second output of the second sub-model corresponding to the whole of the target route based on the second feature data, the first vector, and the second sub-model; and determining, by the processor, an estimated time of arrival (ETA) of the user arriving at a destination when the user travels along the target route based on the second cell state data and the second output of the second sub-model.

* * * * *